(12) United States Patent
Lin

(10) Patent No.: US 7,845,697 B2
(45) Date of Patent: Dec. 7, 2010

(54) VACUUM SUCTION DEVICE

(75) Inventor: Da-Wei Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 281 days.

(21) Appl. No.: 12/253,866

(22) Filed: Oct. 17, 2008

(65) Prior Publication Data
US 2009/0162171 A1 Jun. 25, 2009

(30) Foreign Application Priority Data
Dec. 25, 2007 (CN) .................. 2007 1 0203403

(51) Int. Cl.
B66C 1/02 (2006.01)
B65H 1/00 (2006.01)

(52) U.S. Cl. .................................... 294/64.1

(58) Field of Classification Search ............... 294/64.1, 294/65; 269/21; 414/627, 737, 752.1; 901/40
See application file for complete search history.

(56) References Cited

U.S. PATENT DOCUMENTS

| | | | | |
|---|---|---|---|---|
| 3,608,946 A | * | 9/1971 | Erickson et al. | 294/64.1 |
| 3,720,433 A | * | 3/1973 | Rosfelder | 294/64.1 |
| 4,428,815 A | * | 1/1984 | Powell et al. | 294/64.1 |
| 6,213,528 B1 | * | 4/2001 | Hufken et al. | 294/64.1 |
| 6,336,492 B1 | * | 1/2002 | Nagaoka | 294/64.1 |
| 6,609,741 B2 | * | 8/2003 | Kim | 294/64.1 |
| 6,979,032 B2 | * | 12/2005 | Damhuis | 294/65 |
| 7,661,736 B2 | * | 2/2010 | Schmalz et al. | 294/64.1 |

* cited by examiner

Primary Examiner—Paul T Chin
(74) Attorney, Agent, or Firm—Andrew C. Cheng

(57) ABSTRACT

A vacuum suction device includes an inner cylindrical body, an outer enclosure, a vacuum pump, an ion generator, and a vacuum picking member. The inner cylindrical body has a through hole defined therein. The inner cylindrical body is received in a through hole of the outer enclosure and is rotatable relative to the outer enclosure such that the through hole alternatively couples the vacuum picking member to one of the vacuum pump and the ion generator. The vacuum pump is coupled to the third through opening of the outer enclosure. The ion generator is coupled to the second through opening of the outer enclosure. The vacuum picking member is configured for picking a workpiece, the vacuum picking member being coupled to the first through opening of the outer enclosure.

6 Claims, 3 Drawing Sheets

VACUUM SUCTION DEVICE

BACKGROUND

1. Technical Field

The present invention generally relates to a vacuum suction device, and particularly relates to a vacuum suction device for picking optical components during assembling of lens module.

2. Discussion of Related Art

Camera modules are widely used in various most popular portable electronic devices such as mobile phones, laptop computers and personal digital assistants (PDAs). Generally, a camera module includes a lens module and an image sensor (e.g. a Charge Coupled Device (CCD) image sensor or a complementary metal oxide semiconductor (CMOS) image sensor). Optical performance of the lens module is very important to a camera module.

A lens module generally includes a barrel holder, a barrel held on the barrel holder, and a number of optical members (i.e. filters, micro lenses) and structural members (i.e. spacers, gaskets) assembled in sequent in the barrel. To obtain a high optical performance, the optical members and structural members in the barrel must be assembled accurately. However, the optical members and the structural members are usually made of plastic material, which are very easy to carry static electricity. In addition, the optical members and the structural members have a little weight. Therefore, the electrostatic repulsion between different parts may move the assembled parts away from their predetermined position, thereby deteriorating the optical performance of the lens module.

Therefore, there is a desire to provide a vacuum suction device that is capable of eliminating electrostatic repulsion between different parts during assembling a lens module.

SUMMARY

In one exemplary embodiment, a vacuum suction device includes an inner cylindrical body, an outer enclosure, a vacuum pump, an ion generator, and a vacuum picking member. The inner cylindrical body has an outer circumferential surface, a first opening and a second opening, and a through hole defined therein. The first and second openings are exposed at the outer circumferential surface. The through hole extends from the first opening to the second opening. The outer enclosure has a circumferential inner wall surface, a circumferential outer wall surface and a cylindrical through hole surrounded by the circumferential inner wall surface. The outer enclosure has a first through opening, a second through opening and a third through opening defined therein. The first, second and third through openings extend from the circumferential inner wall surface to the circumferential outer wall surface. The inner cylindrical body is received in the through hole of the outer enclosure and is rotatable relative to the outer enclosure between a first position where the first opening of the inner cylindrical body is coupled to the first through opening of the outer enclosure and the second opening is coupled to the third through opening, and a second position where the first opening of the inner cylindrical body is coupled to the second through opening of the outer enclosure and the second opening is coupled to the first through opening. The vacuum pump is coupled to the third through opening of the outer enclosure. The ion generator is coupled to the second through opening of the outer enclosure. The vacuum picking member is configured for picking a workpiece, the vacuum picking member being coupled to the first through opening of the outer enclosure.

This and other features and advantages of the present invention as well as the preferred embodiments thereof and a vacuum suction device in accordance with the invention will become apparent from the following detailed description and the descriptions of the drawings.

BRIEF DESCRIPTION OF THE DRAWINGS

Many aspects of the present invention can be better understood with reference to the following drawings. The components in the drawings are not necessarily drawn to scale, the emphasis instead being placed upon clearly illustrating the principles of the present invention.

DETAILED DESCRIPTION OF THE PREFERRED EMBODIMENTS

Figure 1:
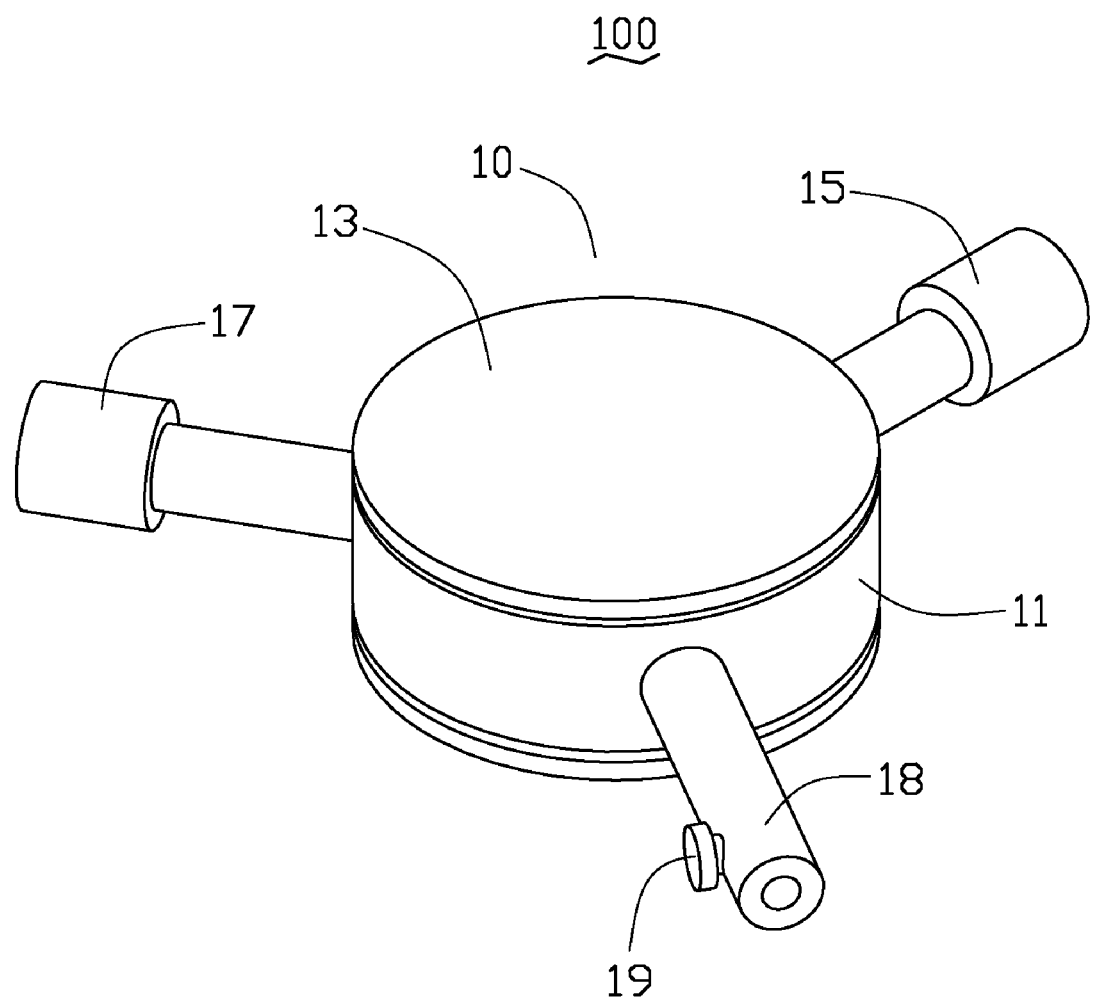
FIG. 1 is a perspective view of a vacuum suction device in accordance with a first embodiment.
Figure 2:
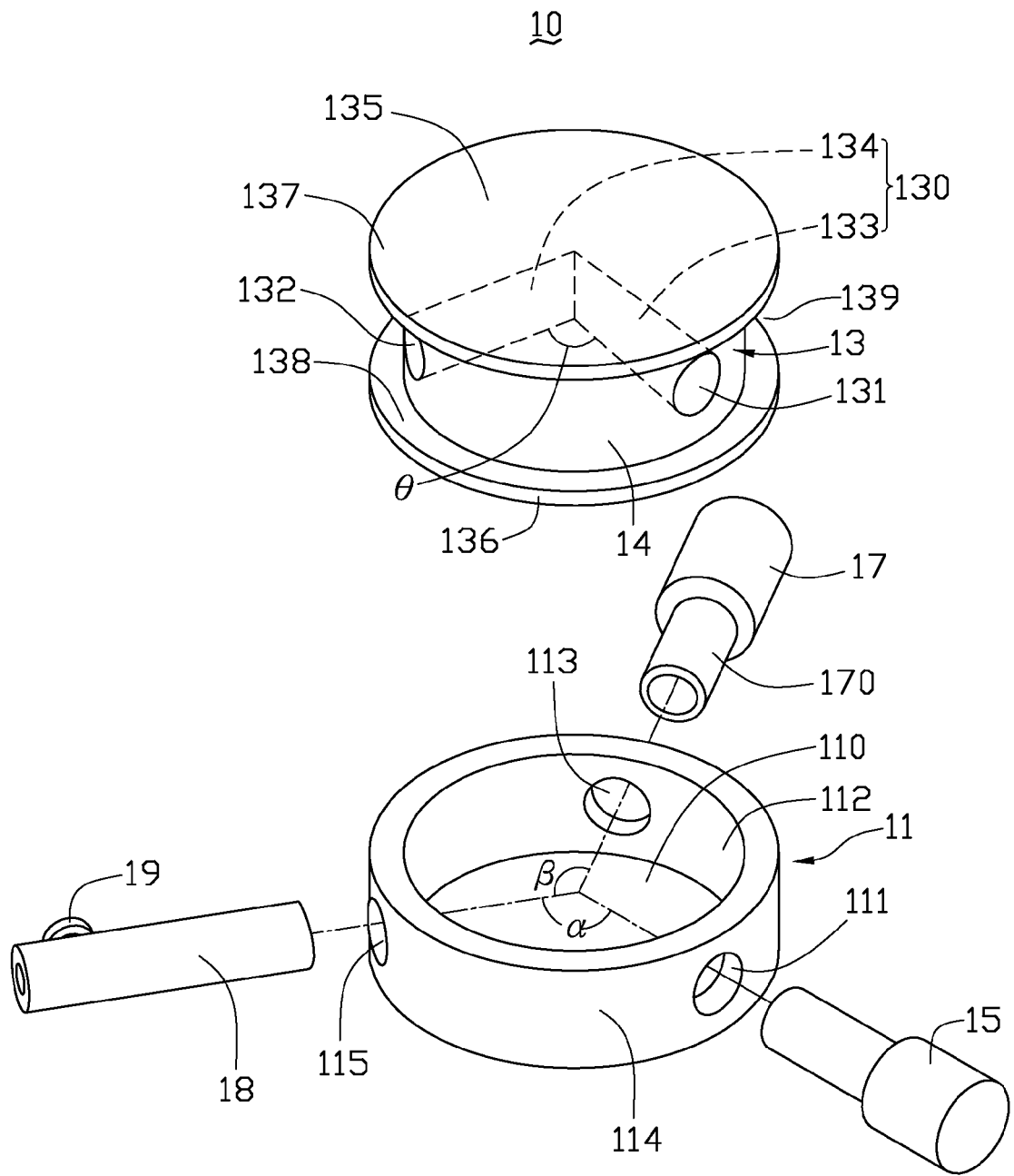
FIG. 2 is an exploded perspective view of the vacuum suction device of FIG. 1.

Referring to FIGS. 1 and 2, a vacuum suction device 100 in accordance with a first embodiment includes a switch valve 10, a vacuum pump 15, an ion generator 17, and a vacuum picking member 18.

The switch valve 10 includes an outer enclosure 11 and an inner cylindrical body 13 rotatably received in the outer enclosure 11. The outer enclosure 11 is columnar and has a circumferential inner wall surface 112, a circumferential outer wall surface 114 and a cylindrical through hole 110 surrounded by the circumferential inner wall surface 112. An outer diameter of the inner cylindrical body 13 is equal to an inner diameter of the outer enclosure 11. Therefore, the inner cylindrical body 13 is received in and is in tightly contact with the outer enclosure 11.

The outer enclosure 11 includes a first through opening 111, a second through opening 113, and a third through opening 115 formed in a sidewall thereof. The first through opening 111, the second through opening 113, and the third through opening 115 are separated from each other and extend from the circumferential inner wall surface 112 to the circumferential outer wall surface 114. In the present embodiment, the first through opening 111 and the third through opening 115 defines an arc between thereof, and $\alpha$ represents a radian angle of the arc. The second through opening 113 and the third through opening 115 defines an arc between thereof, and $\beta$ represents a radian angle of the arc. The radian angle $\alpha$ is equal to the radian angle $\beta$. In other words, the third through opening 115 is on a central line of an imaginary line between the first through opening 111 and the second through opening 113. Because of the outer enclosure 11 cylindrical, a distance between the first through opening 111 and the third through opening 115 is equal to a distance between the second through hole 113 and the third through opening 115.

The inner cylindrical body 13 has an outer circumferential surface 14, a first opening 131, a second opening 132, and a through hole 130 defined therein. The first and second openings 131, 132 are exposed at the outer circumferential surface 14. The through hole 130 extends from the first opening 131 to the second opening 132. The through hole 130 includes a first portion 133 and a second portion 134 at its two opposite ends. The first portion 131 and the second portion define a radian angle $\theta$ between thereof on an outer side surface of the inner cylindrical body 13. The radian angle $\theta$ is equal to the radian $\alpha$ and radian $\beta$. It is very easy to manufacture the through hole 130 by drilling two intersectant straight holes. However, it is to be understood that the through hole 130 can be also in curved shape, for example, quarter circular.

In the present embodiment, a top cover 135 and a bottom cover 136 are formed on two opposite ends of the inner cylindrical body 13. A diameter of each of the top cover 135 and the bottom cover 136 is greater than that of the inner cylindrical body 13. In other words, the top cover 135 and the bottom cover 136 forms a top flange 137 and a bottom flange 138 along a radial direction of the inner cylindrical body 13 respectively. The top flange 137, the bottom flange 138 and an outer side surface of the inner cylindrical body 13 cooperatively defines a receiving groove 139. The outer enclosure 11 is rotatably received in the receiving groove 139.

The vacuum pump 15, the ion generator 17 and the vacuum picking member 18 are coupled to the first through opening 111, the second through opening 113, and the third through opening 115 respectively. The vacuum pump 15, the ion generator 17 and the vacuum picking member 18 are all coupled to the valve chamber 110. Examples of the vacuum pump 15 include water-ring vacuum pumps, roots vacuum pumps, oil sealed vacuum pumps and dry mechanical vacuum pumps. In the present embodiment, a fan 170 is adapted for blowing the ionized gas generated in the ion generator 17 to the valve chamber 110. The vacuum suction device 100 further includes a valve 19 mounted on the vacuum picking member 18. The valve 19 controls opening and closing of the vacuum picking member 18.

The inner cylindrical body 13 is capable of alternatively coupling one of the vacuum pump 15 and the ion generator 17 to the vacuum picking member 18 when the inner cylindrical body 13 rotates in the valve chamber 110. Specifically, the through hole 130 can couple the first through opening 111 to the third through opening 115 when the inner cylindrical body 13 is rotated to a predetermined position. As such, the vacuum picking member 18 is in communication with the vacuum pump 15 and is capable of picking an object (i.e. a micro lens). Because the radian α is equal to the radian β, the through hole 13 couples the second through hole 113 to the third through hole 115 when the inner cylindrical body 13 rotates a radian β clockwise. In this instance, the ion generator 17 is in communication with the vacuum picking member 18, ionized gas generated in the ion generator 17 comes into contact with a surface of the object opposite to the vacuum picking member 18. The ionized gas can neutralize the electron on the surface of the object.

Figure 3:
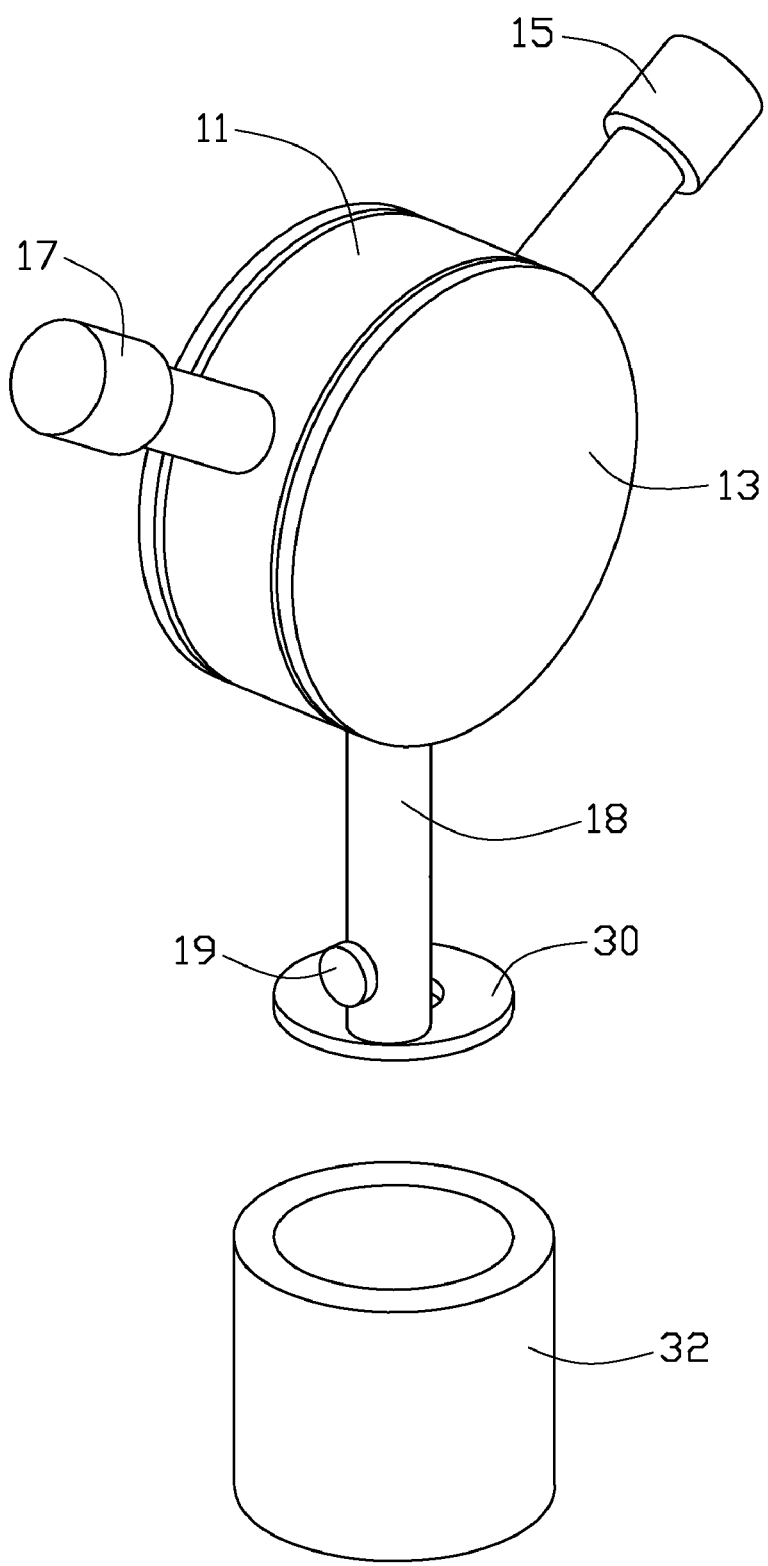
FIG. 3 is a schematic view showing a practical application of the vacuum suction device of FIG. 1.

As shown in FIG. 3, during using of the vacuum suction device 100, the vacuum suction device 18 picks up an object 30 (i.e. a micro lens or a gasket) when the valve 19 is opened. An operator or an automatic machine (i.e. an industrial robot) can hold the vacuum suction device 100 and place the object 30 in a housing 32 (i.e. a barrel). After assembling the object 30 in the housing 32, the valve 19 can be closed. In this instance, air in the outer atmosphere enters into the vacuum picking member 18 thereby reducing a pressure difference between two opposite surfaces of the object 30. The object 30 is released by the vacuum picking member 18 when the pressure difference is less than a weight of the object 30.

In addition, when the object 30 is assembled in the housing 32, the inner cylindrical body 13 can be rotated to a predetermined position such that the ion generator 17 is coupled to the vacuum picking member 18. Firstly, the ionized gas from the ion generator 17 also applies a pressure on the object 30 thereby accelerating a releasing process of the object 30. Secondly, the ionized gas can neutralizes the electron on the surface of the object 30. As a result, during assembling another part on the object 30, there is no electrostatic repulsion between the object 30 and another part can be accurately assembled with the object 30. It is to be understood that the object 30 can also carry positive electricity. To neutralize positive electricity, the ion generator 17 must produce electron or negative ions.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A vacuum suction device comprising:
    an inner cylindrical body having an outer circumferential surface, a first opening and a second opening, and a through hole defined therein, the first and second openings exposed at the outer circumferential surface, the through hole extending from the first opening to the second opening;
    an outer enclosure having a circumferential inner wall surface, and a circumferential outer wall surface and a cylindrical through hole surrounded by the circumferential inner wall surface, the outer enclosure having a first through opening, a second through opening and a third through opening defined therein, the first, second and third through openings extending from the circumferential inner wall surface to the circumferential outer wall surface, the inner cylindrical body being received in the through hole of the outer enclosure and being rotatable relative to the outer enclosure between a first position where the first opening of the inner cylindrical body is coupled to the first through opening of the outer enclosure and the second opening is coupled to the third through opening, and a second position where the first opening of the inner cylindrical body is coupled to the second through opening of the outer enclosure and the second opening is coupled to the first through opening; and
    a vacuum pump coupled to the third through opening of the outer enclosure;
    an ion generator coupled to the second through opening of the outer enclosure; and
    a vacuum picking member for picking a workpiece, the vacuum picking member being coupled to the first through opening of the outer enclosure.

2. The vacuum suction device as claimed in claim 1, wherein the vacuum pump, the ion generator, and the vacuum picking member are engaged in the third, second, and first through openings respectively.

3. The vacuum suction device as claimed in claim 1, wherein a distance between the first through opening and the third through opening is equal to a distance between the first through opening and the third through opening.

4. The vacuum suction device as claimed in claim 1, further comprising a top cover and a bottom cover respectively formed on opposite ends of the inner cylindrical body, the top cover, the bottom cover, and the cylindrical body cooperatively defining an annular receiving groove, the outer enclosure being slidably received in the receiving groove.

5. The vacuum suction device as claimed in claim 1, wherein the ion generator provides cations to the inner cylindrical body.

6. The vacuum suction device as claimed in claim 1, wherein the vacuum picking member includes a tubular body.

* * * * *